United States Patent
Lu et al.

(10) Patent No.: US 9,146,722 B2
(45) Date of Patent: Sep. 29, 2015

(54) REINSTALLING A COMPUTER BASED ON FREQUENCY OF APPLICATION UTILIZATION

(75) Inventors: Charisse Lu, Dobbs Ferry, NY (US); Emily J. Ratliff, Austin, TX (US); Johnny Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2296 days.

(21) Appl. No.: 12/103,730

(22) Filed: Apr. 16, 2008

(65) Prior Publication Data
US 2009/0265702 A1 Oct. 22, 2009

(51) Int. Cl.
- G06F 9/44 (2006.01)
- G06F 15/16 (2006.01)
- G06F 9/445 (2006.01)
- G06F 11/34 (2006.01)

(52) U.S. Cl.
CPC ............. *G06F 8/61* (2013.01); *G06F 11/3476* (2013.01)

(58) Field of Classification Search
USPC .................................................. 717/174, 175
See application file for complete search history.

(56) References Cited

U.S. PATENT DOCUMENTS

| | | | |
|---|---|---|---|
| 6,101,576 A * | 8/2000 | Kobayashi et al. | 711/122 |
| 6,684,229 B1 | 1/2004 | Luong et al. | |
| 6,782,541 B1 * | 8/2004 | Cohen et al. | 719/318 |
| 6,785,713 B1 * | 8/2004 | Freeman et al. | 709/208 |
| 6,922,724 B1 * | 7/2005 | Freeman et al. | 709/223 |
| 6,941,135 B2 | 9/2005 | Minear et al. | |
| 7,237,140 B2 * | 6/2007 | Nakamura et al. | 714/4.5 |
| 7,454,199 B2 * | 11/2008 | Minear et al. | 455/418 |
| 7,849,457 B1 * | 12/2010 | Pulido | 717/173 |
| 2006/0041572 A1 * | 2/2006 | Maruyama | 707/101 |
| 2006/0248187 A1 * | 11/2006 | Thorpe et al. | 709/224 |
| 2007/0043973 A1 * | 2/2007 | Schneider | 714/15 |
| 2007/0050301 A1 * | 3/2007 | Johnson | 705/59 |
| 2008/0177994 A1 * | 7/2008 | Mayer | 713/2 |
| 2009/0119779 A1 * | 5/2009 | Dean et al. | 726/26 |
| 2009/0150545 A1 * | 6/2009 | Flores et al. | 709/224 |

OTHER PUBLICATIONS

Gabriel, R. et al. "Conscientious Software" OOPSLA'06, Oct. 22-26, 2006, Portland, OR, USA, pp. 433-450.
Bal, H. et al. "Performance Evaluation of the Orca Shared-Object System" ACM Transactions on Computer Systems, Vol. 16, No. 1, Feb. 1998, pp. 1-40.
Saito, Y. et al "Optimistic Replication" ACM Computing Surveys, vol. 37, No. 1, Mar. 2005, pp. 42-81.

(Continued)

*Primary Examiner* — Don Wong
*Assistant Examiner* — Mohammad Kabir
(74) *Attorney, Agent, or Firm* — Russell Ng PLLC; Steven L. Bennett

(57) ABSTRACT

A system and method for efficiently reinstalling computer software, which tracks frequency of utilization for each software application loaded onto the computer and reinstalls applications based on frequency of utilization, with the option to reinstall a computer operating system first or to reinstall computer applications along with libraries, so that computer users can resume working as soon as possible instead of waiting many hours for the entire reinstallation image to complete before a computer system reboot allows for continuation of computer usage.

18 Claims, 3 Drawing Sheets

(56) References Cited

OTHER PUBLICATIONS

Seungwon, N. et al "Design and Implementation of an Automatic Installation System for Application Program in PDA" Knowledge-Based Intelligent Information and Engineering Systems 7th International Conference, KES 2003, Oxford, UK, Sep. 3-5, 2003, pp. 936-943.

Bizovi, M. "SMP/E R6: Installation, Reinstallation, and Redistribution" Proceedings Share Europe Spring Meeting, Mar. 30-Apr. 3, 1992, pp. 37-65.

* cited by examiner

REINSTALLING A COMPUTER BASED ON FREQUENCY OF APPLICATION UTILIZATION

BACKGROUND OF THE INVENTION

1. Technical Field

The present invention relates in general to computers, in particular to computer software, and more particularly to reinstalling computer software.

2. Description of the Related Art

A common frustration among computer users occurs when there is a fatal hardware flaw in a computer system that necessitates reinstallation of the entire operating system and reinstallation of non-base applications on that operating system. Few systems have the capability to customize the reinstallation of backup or archival images onto a computer system. However, the current strategy of reinstallation of archive images does not take into account the most frequently utilized applications that a user would need installed the soonest upon reinstalling applications on a new computer. For example, while reinstallation of foreign language fonts occurs, such activity on a new computer may prevent a user from using the system to perform other tasks that are of a more urgent need to the user. Therefore, a need exists for efficient reinstallation of computer software based on frequency of utilization for each software application loaded onto a computer.

SUMMARY OF THE INVENTION

It is therefore one object of the present invention to provide an improved method and system for efficiently reinstalling computer software, which tracks frequency of utilization for each software application loaded onto the computer and reinstalls applications based on frequency of utilization.

The foregoing objects are achieved as now described: a system and method are disclosed for efficiently reinstalling computer software, which tracks frequency of utilization for each software application loaded onto the computer and reinstalls software applications based on frequency of utilization, with the option to reinstall a computer operating system first before reinstalling computer applications and libraries.

At the time of setting up a reinstallation system according to a user's needs, a user can adjust the priority of reinstallation onto a new computer based on frequency of utilization of computer applications. The user can also adjust the priority of reinstallation onto a new computer based on frequency of utilization of computer libraries. The user can further adjust the priority of reinstallation onto a new computer based on frequency of utilization of computer applications while deferring to reinstallation of the computer operating system before reinstallation of any applications or libraries.

The system for efficient reinstallation of computer software comprises a computer, an operating system, a tracking program which reports a frequency of utilization for each software application loaded onto the computer, and means for reinstalling applications based on said frequency of utilization. After the tracking program is installed onto a running computer system, a user can configure the analysis program to track daily usage of applications and libraries on the computer. At a set time, either daily or weekly for example, these statistics are uploaded (along with any updated application specific configuration files) to a backup or archival server. When the user requires a system reinstallation, the user proceeds with a basic installation of an operating system, after which the network restoration program consults the usage statistics file compiled by the tracking program. Thereafter, a priority installation plan is formulated wherein application and requisite libraries are installed first, and then applications and libraries used least often are then installed in the background or during "offline hours." Within many larger applications, various sub-portions of the application could be broken down and installed asynchronously, wherein the databases that the user uses the most are installed first, and then the rarely used databases are installed at lower priority times.

DETAILED DESCRIPTION OF THE INVENTION

The illustrative embodiments contained herein provide a method, system, and program product for efficiently reinstalling computer software, which tracks frequency of utilization for each software application loaded onto the computer and reinstalls applications based on frequency of utilization.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is therefore not to be taken in a limiting sense, and the scope of the present invention is defined only by the appended claims. Within the descriptions of the figures, the specific numerals assigned to the elements are provided solely to aid in the description and are not meant to imply any limitations (structural or functional) on the invention.

It is understood that the use of specific component, device and/or parameter names are for example only and are not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 1:
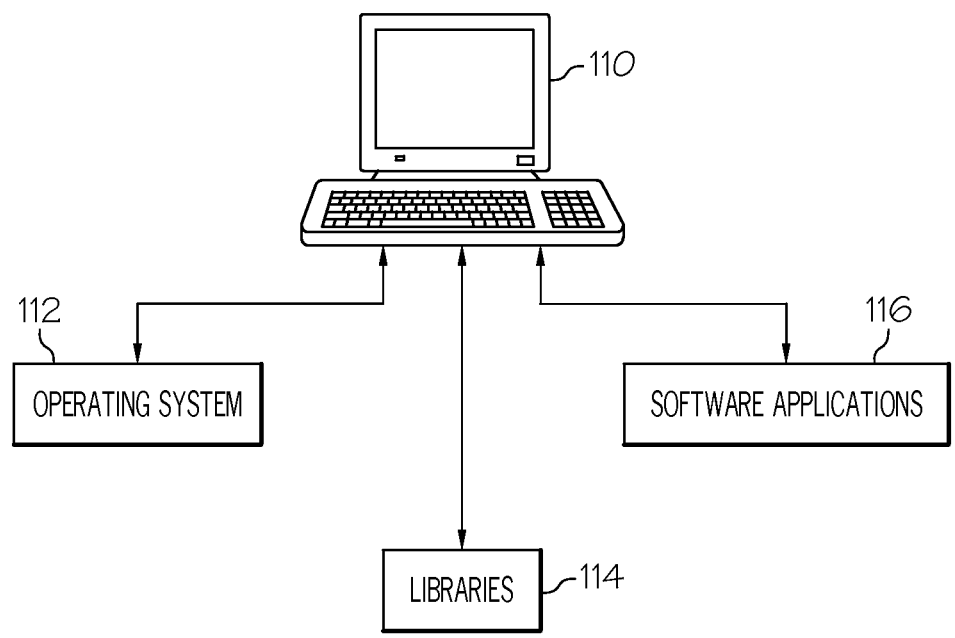
FIG. 1 is a diagram of a computer that may contain an operating system, libraries, and software applications.

With reference now to the figures, and in particular to FIG. 1, there is illustrated a computer 110 associated with an operating system 112, libraries 114, and software applications 116. The computer 110 may be associated with other components not appearing in this embodiment. In one embodiment, computer 110 may be a laptop computer. In another embodiment, computer 110 may be a PDA or any other device used to run software applications.

Figure 2:
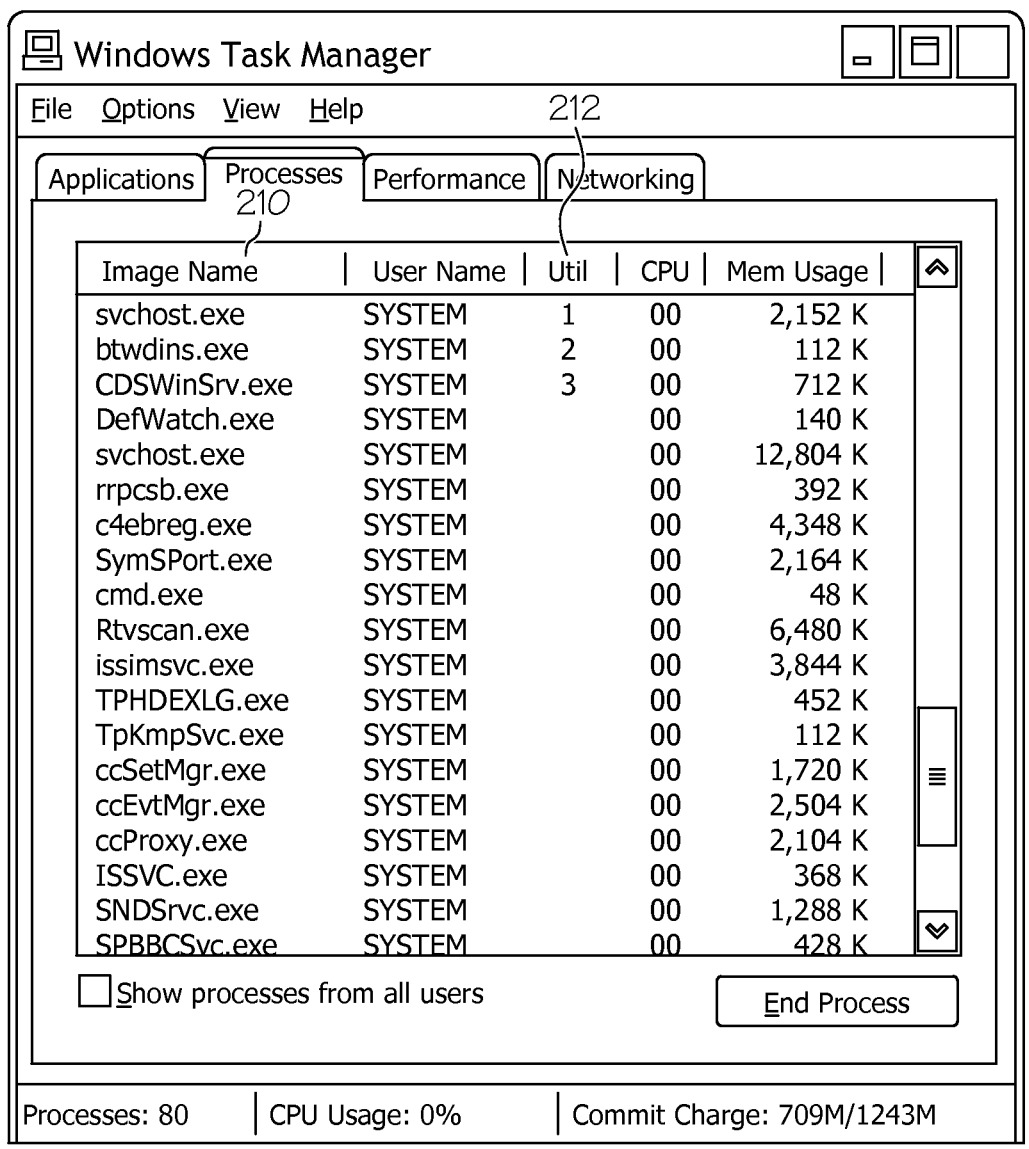
FIG. 2 is a pictorial representation of a graphical user interface showing how a computer may track frequency of utilization of computer applications loaded onto its system, according to one embodiment of the invention.

Referring now to FIG. 2, there is depicted a pictorial representation of a graphical interface showing how a computer may track frequency of utilization of computer applications loaded onto its system, according to one embodiment of the invention. In this graphical user interface, there is illustrated a list 210 of software applications or libraries running on a computer. There is also depicted a column that tracks utilization 212 for each corresponding software application or library. The list of software applications or libraries may be sorted according to image name, memory usage, CPU, or utilization. This list is used to track frequency of utilization of computer applications loaded onto a computer system.

Figure 3:
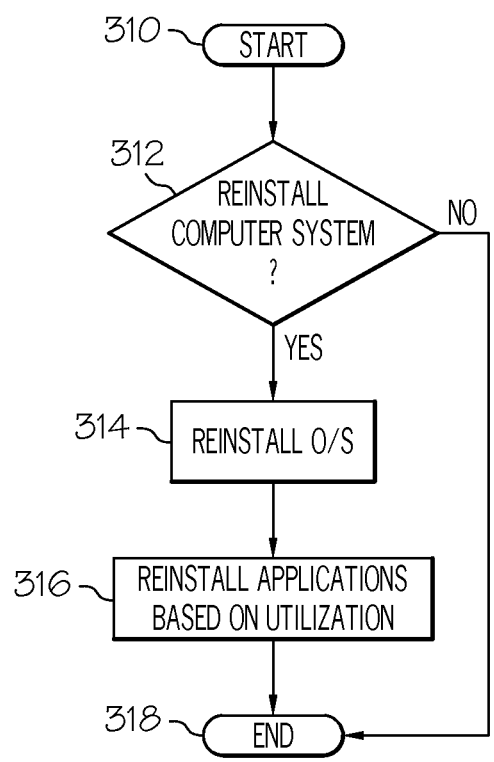
FIG. 3 is a logic flow chart of the process of efficiently reinstalling computer software wherein the user may choose to prioritize the reinstallation of a computer operating system above reinstallation of computer applications.

With reference now to FIG. 3, there is depicted a logic flow chart of the process of efficiently reinstalling computer software wherein the user may choose to prioritize the reinstallation of a computer operating system above reinstallation of computer applications. The process comprises the steps of: reinstalling a computer system, reinstalling an operating system, and reinstalling software applications based upon their utilization. The process begins with step 310, which depicts the process moving forward to step 312, which illustrates the decision to reinstall a computer system. This decision may be brought about by an internal crash or other system failure that may require reinstallation of all software applications and libraries. If the computer system needs to be reinstalled, the process continues to step 314, which depicts reinstallation of the computer operating system. The reinstallation of the operating system should occur before reinstallation of software applications and libraries so that the computer may function properly after system failure. This reinstallation of the operating system may occur such that only mandatory portions of the operating system are installed before moving onto the next step, in order to save time and prioritize reinstallation of all applications on a new system. Non-mandatory portions of the operating system can be reinstalled after prioritized applications. After the computer operating system or mandatory portions thereof are reinstalled, the process proceeds to step 316, which illustrates reinstallation of software applications based on utilization. The utilization of software applications is tracked in a program that runs on a functioning computer, and the program is accessed upon the need for reinstallation of computer applications following a system failure. If there is no need to reinstall the computer system, or after the reinstallation of software applications based upon utilization, the process ends, as depicted at step 318.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed:

1. A system for efficient reinstallation of computer software, said system comprising:
   a computer that executes a plurality of software programs;
   data storage including program code configured to record a frequency of utilization for each of said plurality of software programs, and
   following a system failure, to automatically reinstall the plurality of software programs in a particular order based on said frequency of utilization.

2. The system of claim 1, wherein:
   the plurality of software programs includes an operating system of the computer; and
   the program code is configured to first reinstall the operating system.

3. The system of claim 2, wherein:
   the plurality of software programs includes multiple application programs; and
   the program code is configured to reinstall most frequently used application programs after at least one component of the operating system is reinstalled.

4. The system of claim 2, wherein mandatory components of the operating system are first to be reinstalled onto the computer.

5. The system of claim 4, wherein the program code is configured to reinstall most frequently used application programs and libraries after the mandatory components of the operating system are reinstalled and to thereafter reinstall at least one non-mandatory component of the operating system.

6. The system of claim 1, wherein the program code reports a frequency of utilization for each of said plurality of software programs.

7. A method for efficient reinstallation of computer software, said method comprising:
   tracking a frequency of utilization for each of a plurality of software programs loaded onto a computer; and
   automatically reinstalling the plurality of software programs applications, in a particular order based on said frequency of utilization.

8. The method of claim 7, wherein the automatically reinstalling includes automatically first reinstalling an operating system onto the computer.

9. The method of claim 8, wherein the automatically reinstalling includes reinstalling most frequently used application programs after at least one component of the operating system is reinstalled.

10. The method of claim 8, wherein automatically first reinstalling the operating system includes automatically first reinstalling mandatory components of the operating system.

11. The method of claim 10, wherein the automatically reinstalling includes automatically reinstalling most frequently used applications and libraries after the mandatory components of the operating system are reinstalled and thereafter reinstalling at least one non-mandatory component of the operating system.

12. The method of claim 7, wherein the tracking includes reporting a frequency of utilization for multiple software programs loaded onto the computer.

13. A computer program product for efficient reinstallation of computer software, said computer program product comprising:
   a non-transitory computer readable storage medium;
   program code on said computer readable storage medium configured to:
      track a frequency of utilization for each of a plurality of software programs loaded onto a computer; and
      automatically reinstall the plurality of software programs applications, in a particular order based on said frequency of utilization.

14. The computer program product of claim 13, wherein:
   the plurality of software programs includes an operating system of the computer; and
   the program code is configured to first reinstall at least one component of the operating system onto the computer.

15. The computer program product of claim 14, wherein:
   the plurality of software programs includes multiple application programs; and
   the program code is configured to reinstall most frequently used application programs after at least one component of the operating system is reinstalled.

16. The computer program product of claim 14, wherein mandatory components of the operating system are first to be reinstalled onto the computer.

17. The computer program product of claim 16, wherein the program code is configured to reinstall most frequently used application programs and libraries after the mandatory components of the operating system are reinstalled and to thereafter reinstall at least one non-mandatory component of the operating system.

18. The computer program product of claim 13, wherein the program code reports a frequency of utilization for each of said plurality of software programs.

\* \* \* \* \*